US008121809B2

(12) United States Patent
Mealy et al.

(10) Patent No.: US 8,121,809 B2
(45) Date of Patent: Feb. 21, 2012

(54) APPARATUS AND METHOD FOR DETERMINING THE POSITION OF A DEVICE

(75) Inventors: James Mealy, Corvallis, OR (US); James D. Bledsoe, Albany, OR (US); Asher Simmons, Corvallis, OR (US)

(73) Assignee: Marvell International Ltd. (BM)

( * ) Notice: Subject to any disclaimer, the term of this patent is extended or adjusted under 35 U.S.C. 154(b) by 295 days.

(21) Appl. No.: 12/041,307

(22) Filed: Mar. 3, 2008

(65) Prior Publication Data
US 2008/0215286 A1 Sep. 4, 2008

Related U.S. Application Data

(60) Provisional application No. 60/892,693, filed on Mar. 2, 2007.

(51) Int. Cl.
*G01C 9/00* (2006.01)
(52) U.S. Cl. ...................................................... 702/150
(58) Field of Classification Search .................. 702/150; 342/443, 357.09; 358/1.14, 1.18; 345/8
See application file for complete search history.

(56) References Cited

U.S. PATENT DOCUMENTS

| | | | |
|---|---|---|---|
| 3,469,422 A | 9/1969 | Minton | |
| 4,387,579 A | 6/1983 | Branke et al. | |
| 4,714,936 A | 12/1987 | Helinski et al. | |
| 5,351,069 A | 9/1994 | Koike et al. | |
| 5,578,813 A | 11/1996 | Allen et al. | |
| 5,593,236 A | 1/1997 | Bobry | |
| 5,825,995 A | 10/1998 | Wiklof et al. | |
| 5,861,877 A | 1/1999 | Kagayama et al. | |
| 5,927,872 A | 7/1999 | Yamada | |
| 6,000,946 A | 12/1999 | Snyders et al. | |
| 6,030,582 A | 2/2000 | Levy | |
| 6,217,017 B1 | 4/2001 | Yamazaki | |
| 6,312,124 B1 | 11/2001 | Desormeaux | |
| 6,332,677 B1 | 12/2001 | Steinfeld et al. | |
| 6,357,939 B1 | 3/2002 | Baron | |
| 6,390,249 B2 | 5/2002 | Tachibana | |
| 6,467,870 B2 | 10/2002 | Matsumoto et al. | |
| 6,517,266 B2 | 2/2003 | Saund | |
| 6,580,244 B2 | 6/2003 | Tanaka et al. | |
| 6,682,190 B2 | 1/2004 | Rasmussen et al. | |

(Continued)

FOREIGN PATENT DOCUMENTS

EP 1 543 981 6/2005

(Continued)

OTHER PUBLICATIONS

International Search Report mailed Jul. 28, 2008, for International Application No. PCT/US2008/55636.

(Continued)

*Primary Examiner* — Drew A Dunn
*Assistant Examiner* — Xiuquin Sun

(57) ABSTRACT

An apparatus and method are disclosed for use in a device, such as a handheld printer or scanner, having functionality that requires information of its position relative to an origin and initial orientation. The module includes two sensors to generate movement data indicative of movement direction and orientation changes of the device. The location and orientation of the device relative to the origin and initial orientation is derived based on the movement data. A handheld printer or scanner implementing the device may thus be moved in different directions across a media to print or scan images, text, or other objects.

29 Claims, 3 Drawing Sheets

U.S. PATENT DOCUMENTS

| | | | |
|---|---|---|---|
| 6,773,177 | B2 | 8/2004 | Denoue et al. |
| 6,789,869 | B2 | 9/2004 | Takeishi |
| 6,851,878 | B2 | 2/2005 | Hemmerlin |
| 6,896,349 | B2 | 5/2005 | Valero et al. |
| 6,933,889 | B1 * | 8/2005 | Wolf et al. ............... 342/443 |
| 6,942,335 | B2 | 9/2005 | Trent |
| 6,951,778 | B2 | 10/2005 | Akhavain et al. |
| 6,952,284 | B2 | 10/2005 | Andrews et al. |
| 7,013,029 | B2 | 3/2006 | Keskar et al. |
| 7,108,370 | B2 | 9/2006 | Breton |
| 7,184,167 | B1 | 2/2007 | Ito et al. |
| 7,336,388 | B2 | 2/2008 | Breton |
| 7,627,189 | B2 | 12/2009 | Donomae et al. |
| 7,679,604 | B2 | 3/2010 | Uhlik et al. |
| 7,808,450 | B2 * | 10/2010 | Wanda et al. ............... 345/8 |
| 7,812,994 | B2 | 10/2010 | Carlson et al. |
| 2003/0043388 | A1 | 3/2003 | Andrews et al. |
| 2003/0152679 | A1 | 8/2003 | Garwood |
| 2004/0252051 | A1 * | 12/2004 | Johnson ............... 342/357.09 |
| 2006/0050131 | A1 | 3/2006 | Breton |
| 2006/0279784 | A1 * | 12/2006 | Carlson et al. ............ 358/1.18 |
| 2007/0009277 | A1 | 1/2007 | Shoen |
| 2007/0080494 | A1 | 4/2007 | Marshall et al. |
| 2008/0123126 | A1 * | 5/2008 | Harris ............... 358/1.14 |
| 2008/0144053 | A1 | 6/2008 | Gudan et al. |
| 2008/0204770 | A1 | 8/2008 | Bledsoe et al. |
| 2008/0211848 | A1 | 9/2008 | Mealy et al. |
| 2008/0211864 | A1 | 9/2008 | Mealy et al. |
| 2008/0212118 | A1 | 9/2008 | Mealy et al. |
| 2008/0212120 | A1 | 9/2008 | Mealy et al. |
| 2008/0213018 | A1 | 9/2008 | Mealy et al. |
| 2008/0262719 | A1 | 10/2008 | Bledsoe et al. |

FOREIGN PATENT DOCUMENTS

| | | |
|---|---|---|
| EP | 1 543 981 A3 | 7/2006 |
| WO | WO 03/055689 A1 | 7/2003 |
| WO | WO03/076196 A1 | 9/2003 |
| WO | WO 03/076197 | 9/2003 |
| WO | WO 2004/056577 A1 | 7/2004 |
| WO | WO 2004/088576 | 10/2004 |
| WO | WO 2005/070684 A1 | 8/2005 |

OTHER PUBLICATIONS

Written Opinion of the International Searching Authority mailed on Jul. 28, 2008, for International Application No. PCT/US2008/55636.

GB Search Report for GB Application No. 0610837.7, dated Oct. 31, 2006, 2 pages.

HP Ink Jet Printer Cartridge Anatomy, http://wandel.ca.hp45_anatomy/index.html, printed Apr. 19, 2007, pp. 1-8.

U.S. Appl. No. 11/952,849 entitled, "Handheld Tattoo Printer", filed Dec. 7, 2007, 43 pages.

U.S. Appl. No. 12/036,862, entitled, "Print Head Configuration for Hand-Held Printing", filed Feb. 25, 2008, 32 pages.

U.S. Appl. No. 12/039,491 entitled, "Cap Design for an Inkjet Print Head With Hand-Held Imaging Element Arrangement With Integrated Cleaning Mechanism", filed Feb. 28, 2008. 38 pages.

U.S. Appl. No. 12/041,466 entitled, "Ink Supply for a Hand-Held Ink Jet Printer", filed Mar. 3, 2008, 38 pages.

U.S. Appl. No. 12/074,018 entitled, "Hand-Propelled Labeling Printer", filed Feb. 28, 2008, 47 pages.

U.S. Appl. No. 12/074,123, entitled, "Managing Project Information with a Hand-Propelled Device", filed Feb. 28, 2008, 50 pages.

U.S. Appl. No. 12/132,405 entitled, Device and Method for Dispensing White Ink, filed Jun. 3, 2008, 37 pages.

U.S. Appl. No. 12/141,717, entitled, Hand-Held Printing Device and Method for Tuning Ink Jet Color for Printing on Colored Paper, filed Jun. 18, 2008, 38 pages.

U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/955,027, filed Dec. 18, 2007, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/073,029, filed Feb. 25, 2008, Bledsoe et al.
U.S. Appl. No. 12/083,660, filed Feb. 27, 2008, McKinley et al.
U.S. Appl. No. 12/062,472, filed Apr. 3, 2008, McKinley et al.
U.S. Appl. No. 12/188,056, filed Aug. 7, 2008, Mealy et al.

* cited by examiner

APPARATUS AND METHOD FOR DETERMINING THE POSITION OF A DEVICE

RELATED APPLICATION

This application claims the benefit of U.S. Provisional Application No. 60/892,693, filed on Mar. 2, 2007, which is incorporated herein by reference.

BACKGROUND

1. Technical Field

The present disclosure relates to the field of position sensing, and more particularly to an apparatus and method for determining the absolute position, including the location and orientation, of a device with respect to an origin as the device is moved.

2. Related Art

Many devices rely on positioning data to operate. For example, an inkjet printer relies on positioning data and the mechanics of a print assembly to ensure that thousands of ink dots are placed at precise locations on a media by the nozzles of a print head. Similarly, a scanner relies on positioning data, stable media placement, and a stabilizer bar to move a scan head along the media with precision. The printer and the scanner rely upon the positioning data to control the movement of components that, by design, are mechanically and precisely restricted or confined in direction and movement. Consequently, accurate imaging is achieved.

A stand alone device such as a desktop printer is large enough to include the components required to move the media and print head relative to one another with precision as an image or object is rendered on the media. Likewise, a desktop scanner is large enough to include the components that steadily and precisely move the stabilizer bar along the media. However, such stabilizing and positioning components are usually too large for use in smaller devices. For example, handheld scanners are not large enough to incorporate the components that desktop scanners have to generate accurate image data. Rather, handheld scanners rely on human motor skills to steadily move the stabilizer bar (or some other device that supports the scan head) across the media. Human motor skills are far less precise than the components implemented in desktop devices and the quality of digital images that are obtained with handheld scanners is markedly inferior to that of desktop scanners. An improvement in the operation of handheld devices is desirable.

BRIEF SUMMARY

The following embodiments relate to systems and methods for generating position data for a device. The position data is indicative of the device's position as it is moved and includes the location and orientation of the device with respect to an origin. The position data may be used by the device to perform device functions. For example, the device may be a handheld printer that controls a print head based on the position data to accurately dispense ink on a print media.

In a preferred embodiment, a module has two motion sensors to generate motion signals as a device is moved. The module generates movement data in response to the motion signals. The movement data is indicative of location changes and orientation changes of at least two points on the device. The module communicates the movement data to a processor that determines location and orientation data indicative of the device's position relative to an origin. The processor may communicate the location and orientation data to a device processor for use in executing device functions. The motion sensors may be optical motion sensors, track-ball motion sensors, laser motion sensors, inertial motion sensors, or any other type of motion sensor.

In one implementation, the device is a handheld printer having a wireless communication module to receive image data from a host device. The wireless communication module communicates the image data to the processor, which determines print data based on the image data and the location and orientation data. The print data controls a print mechanism for dispensing ink, dye, or other pigment as the handheld printer is moved over a print media.

In a second implementation, the device is a handheld scanner having an imaging mechanism to generate image signals. A device processor receives the image signals and generates image data based on the image signals and the location and orientation data.

In a second embodiment, a computer readable storage medium has processor executable instructions to receive movement data indicative of location changes and orientation changes of a device and determine location and orientation data indicative of a position of the device relative to a first location and first orientation of the device. The computer readable storage medium may also have processor executable instructions to communicate the location and orientation data to a device processor. If the device is a printer, the computer readable storage medium may have processor executable instructions to determine print data based on image data and the location and orientation data, and communicate the print data to a print mechanism. If the device is a scanner, the computer readable storage medium may have processor executable instructions to receive image signals from an imaging mechanism, and generate image data based on the image signals and the location and orientation data Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to a position module for use in a device having functionality that requires information about its position relative to an origin and initial orientation at the origin as the device is moved. The position module is incorporated into the device and includes a processor and a movement module having two sensors. When the device is moved, both sensors sense device movement and generate movement signals. The movement module generates movement data based on the movement signals. The movement data is indicative of movement direction and distance of each respective sensor, and hence any part of the device. Based on the movement data, the processor determines the location and orientation of the device relative to the origin and initial orientation. The position module may be implemented in devices such as handheld printers and scanners to maintain image alignment as the device is swept over a print media for printing or scanning operations, as examples.

Figure 1:
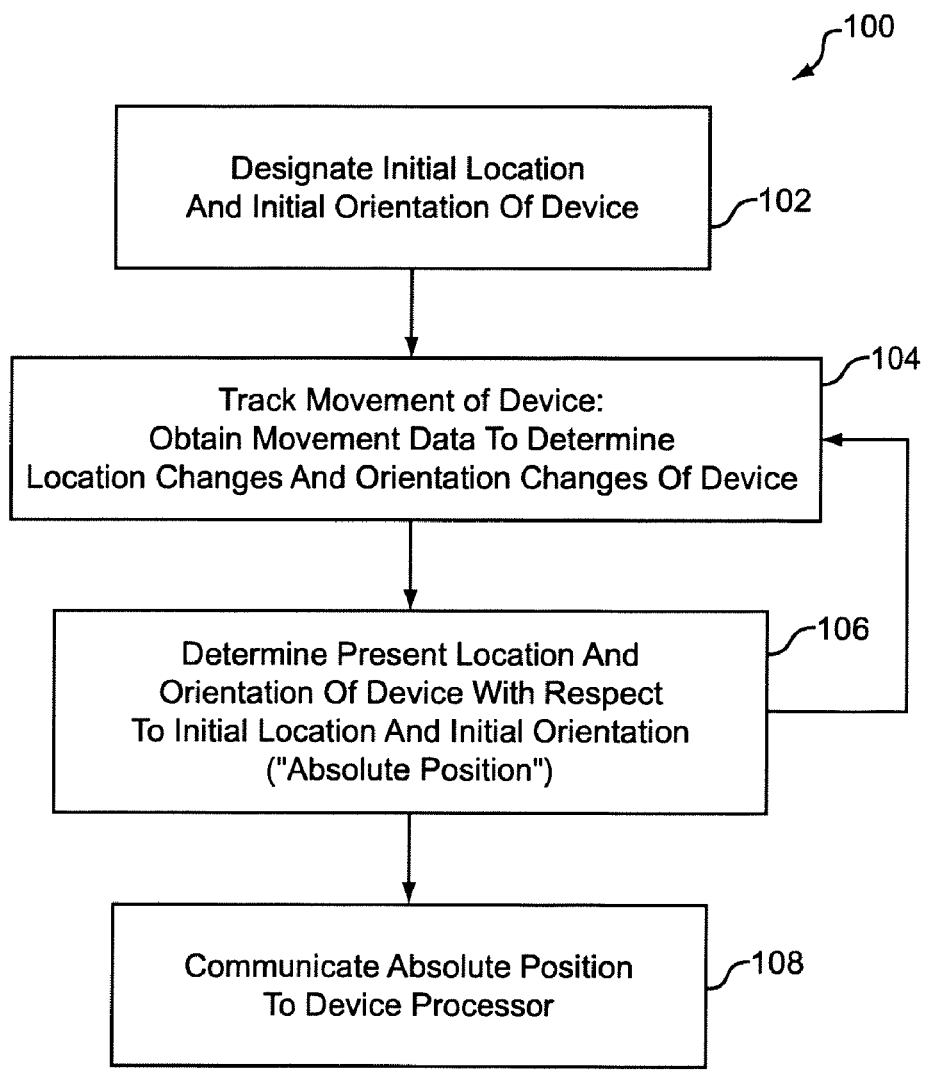
FIG. 1 shows acts for determining the location and orientation of a device with reference to an initial position as the device is moved, in accord with an embodiment of the invention.

FIG. 1 shows acts 100 for determining the position of a device with reference to an initial position as the device is moved. The position of the device is defined by the device's location and orientation. The location of the device may be represented by any point defined within or on the device, such as a center-point. Alternatively, the location of the device may be defined by any point outside the device having a set geometrical relationship to the device. The orientation of the device is defined as an angle relative to an initial orientation.

In one embodiment, the device is set at a position designated as the initial position or "origin" of the device. The origin includes an initial location and initial orientation of the device before it is moved (Act 102). The act of designating an initial location and an initial orientation of the device may be referred to as "zeroing the origin." The initial location and initial orientation may be defined within any two or three dimensional coordinate system. In one implementation, the device is a rectangular handheld printer set at an origin on a print media, such as the top-left corner of a sheet of paper, with the top edge of the handheld printer aligned with the top edge of the sheet of paper and the left edge of the handheld printer aligned with the left edge of the sheet of paper.

As the device is moved (whether by human hand, machine, or self propulsion) movement data is generated to track location changes and orientation changes of the device (Act 104). The movement data may be generated by any component, module, or any mechanism that generates data indicative of movement.

Figure 2:
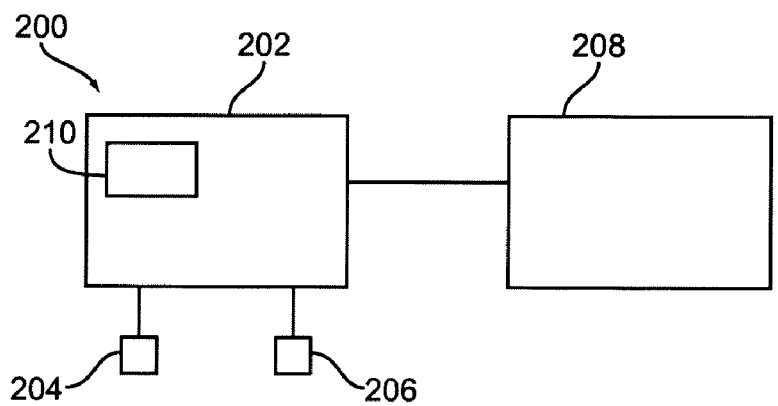
FIG. 2 is a block diagram of an embodiment of a position module for determining the location and orientation of a device with reference to an initial position.

FIG. 2 shows an embodiment of a position module 200 that generates movement data. The position module 200 includes a movement module 202 and a processor 208. The movement module 202 includes two motion sensors 204 and 206. The motion sensors 204, 206 may be optical motion sensors such as light-emitting diode (LED) and complementary medaloxide semiconductor (CMOS) sensor pairs. Each CMOS sensor captures hundreds of images per second as is moves. The movement module 202 includes a movement module processor 210 to receive the images from the motion sensors 204, 206. The movement module processor 210 detects patterns in each image and compares the patterns in successive images to determine movement direction and distance of each CMOS sensor. The movement module processor 210 may be any hardware, software, or firmware based processor. In alternate versions, the motion sensors 204, 206 may be track-ball motion sensors, laser motion sensors, inertial motion sensors, or other type of motion sensors that generate movement signals. In other versions, the movement module 202 may be a mapping type module that detects preprinted infrared (IR) or preprinted visible markings from a print media and correlates them to a programmed map of the markings. Other types of movement modules are contemplated and may be implemented with the position module 200.

Direction and distance data is generated for both motion sensors 204, 206 as the device moves. For example, as motion sensor 204 moves from point A to point B and motion sensor 206 moves from point M to point N, direction and distance data is generated by the movement module 202 for each sensor 204, 206. The location of motion sensor 204 with respect to point A and the location of motion sensor 206 with respect to point M is determined by the movement module 202 based on the direction and distance data generated for each respective sensor 204, 206. When motion sensor 204 next moves from point B to point C, the movement module 202 determines the location of motion sensor 204 with respect to point B. Likewise, when motion sensor 206 moves from point N to point O, the movement module 202 determines the location of motion sensor 206 with respect to point N. The movement module 202 generates movement data indicative of the movement of each motion sensor 204, 206 from point-to-point and communicates the movement data to the processor 208.

The processor 208 determines the position of the device with respect to the origin (the initial location and initial orientation of the device) by cumulating the movement data received from the movement module 202 (Act 106). The position of the device determined by the processor 208 includes both the location and orientation of the device with respect to the origin and may be referred to as the "absolute position" of the device.

The location of the device (or any point, line, or area of the device) is determined by cumulating the movement data, starting from the origin. The orientation of the device is defined as an angle between two lines: the first line is defined by the locations of the two motion sensors when the device is at the origin; the second line is defined by the locations of the two motion sensors when the device is at its respective location. As movement data continues to be received from the movement module 202 as the device moves, the processor 208 continues to update the absolute position of the device. The absolute position of the device may be communicated as location and orientation data to a device processor for use in operating the device (Act 108).

Figure 3:
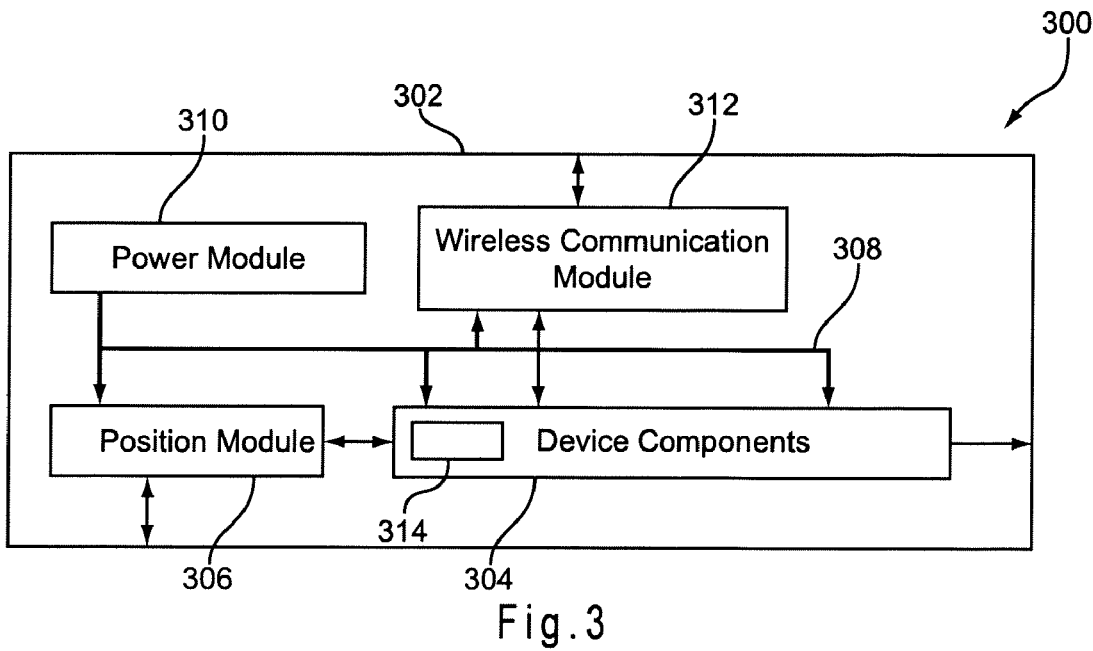
FIG. 3 is a block diagram of an embodiment of a device that includes the position module of FIG. 2.

FIG. 3 is a block diagram of an embodiment of a device 300 that includes a position module 306. The device 300 may be a handheld printer, handheld scanner, other handheld device, or any mobile device.

The device 300 includes a housing 302 and device components 304, including a device processor 314 for executing device functions. The device 300 may also include a data bus 308, a power module 310, and a wireless communication module 312 to communicate with a host (not shown) or other device.

If the device 300 is a handheld printer, the wireless communication module 312 receives image data, such as a bitmap, from the host and communicates the image data to the device processor 314. The device processor 314 determines print data based on the image data and the location and orientation data received from the position module, and communicates the print data to a print mechanism. The print mechanism renders an image or text on a print media.

If the device 300 is a handheld scanner, the device processor 314 receives image signals from an imaging mechanism and determines digital image data based on the image signals and the location and orientation data received from the position module. The device processor 314 communicates the digital image data to the wireless communication module 312, which communicates the image data to the host. The host may be a desktop or laptop computer, or other device that communicates (sends/receives) image data. In alternate embodiments, the host may send/receive other types of data pertinent to the function of the device components 304. The wireless communication module 312 and the host may comprise a network such as a wireless local area network (WLAN), as an example.

Figure 4:
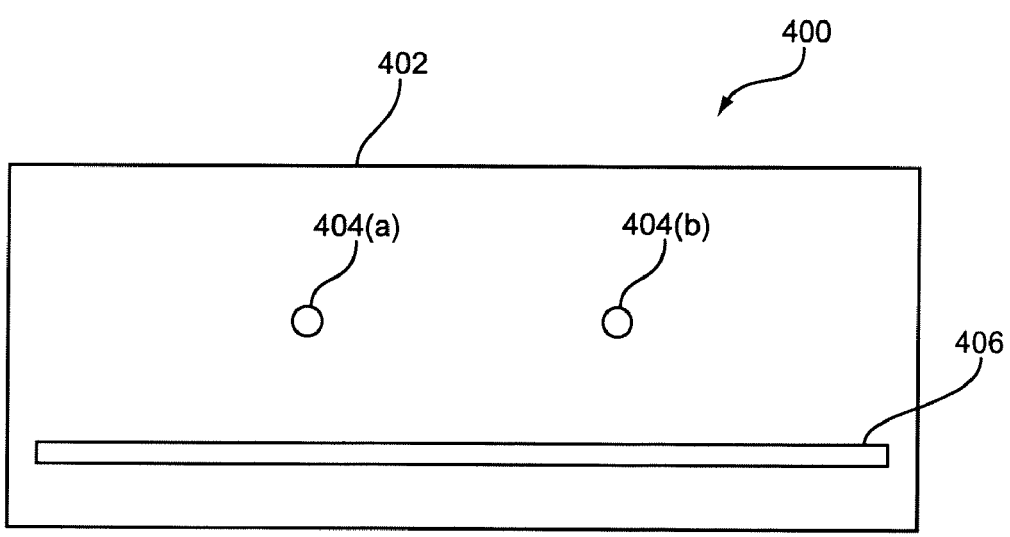
FIG. 4 is an illustration of the printing side of a handheld printer that determines its location and orientation with reference to an initial position as it is moved across a media.

As discussed above, the device 302 may be a handheld printer. FIG. 4 is an illustration of an embodiment of the printing side (underside) 402 of a handheld printer 400 that determines its location and orientation with reference to an initial position as it is moved across a media. The handheld printer 400 has two motion sensors 404(*a*) and 404(*b*) and a print head 406. The handheld printer 400 receives print data from a host. For rendering an image on a media, the handheld printer 400 is moved or swept across the surface of the media. If the handheld printer 400 is smaller than the media, it may need to be swept across the media several times to render a complete image.

As the handheld printer 400 is swept across the media, the motion sensors 404(*a*) and 404(*b*) generate motion signals for determining the absolute position of the print head 406. The print head 406 dispenses print from its nozzles based on the absolute position of the handheld printer 400.

Figure 5:
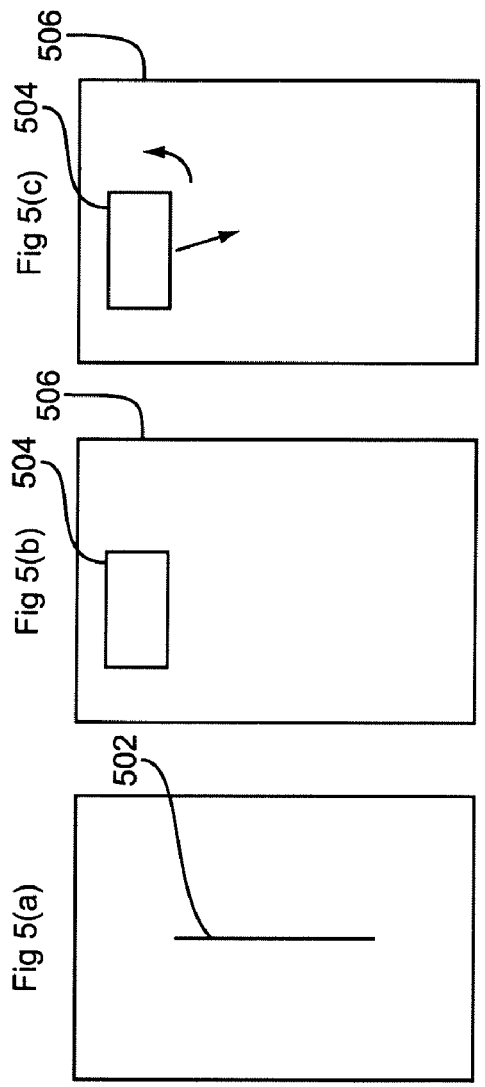
FIGS. 5(*a*) to 5(*e*) illustrate the functionality of the handheld printer of FIG. 4.
Figure 5:
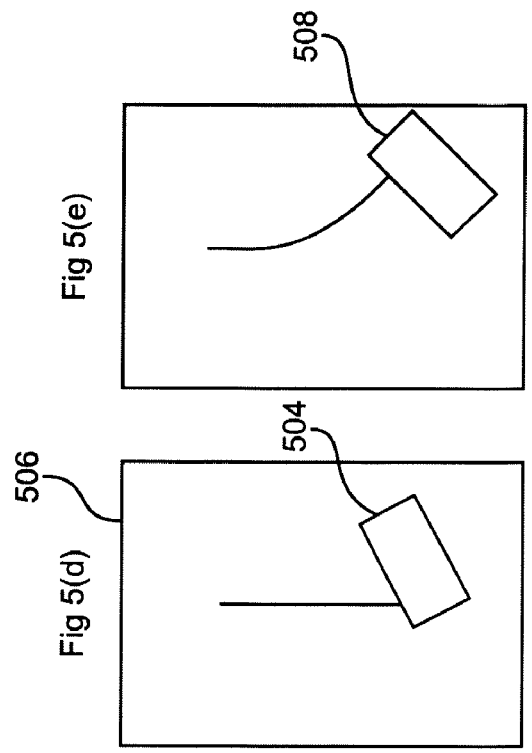

FIGS. 5(*a*)-5(*e*) illustrate the functionality of a handheld printer 400 that dispenses ink (or any pigment or dye) based on its absolute position as it is swept across a media. FIG. 5(*a*) illustrates, in picture format, a digital image of an object 502. The digital image is communicated to the handheld printer 504 shown in FIG. 5(*b*). The handheld printer 504 is set at an origin on a print media 506. FIG. 5(*c*) illustrates with directional arrows the direction of movement and rotation of the handheld printer 504 as it is swept across the media 506. FIG. 5(*d*) illustrates that even though the orientation and alignment of the handheld printer 504 changes as it sweeps across the media 506, the printed object is aligned on the print media 506 as it was in the digital image. Proper alignment was achieved by controlling the print dispenser based on the determined absolute position of the handheld printer 504. In contrast, FIG. 5(*e*) illustrates the result of a handheld printer 508 that does not determine its absolute position.

The methods and systems discussed above for determining the position of a device may also include methods and systems for determining the spatial position of the device. As used herein, the "spatial position" refers to the three-dimensional position and orientation of the device. For example, the position module 200 may include a spatial position module (not shown) to determine three translational coordinates (x-y-z) and three angular (yaw, pitch, and roll) parameters of the device. The translational coordinates and the angular parameters may be referred to collectively as the "six degrees of freedom". The spatial position module may determine the six degrees of freedom based on data received from an inertial motion sensor, such as an accelerometer or gyrometer, as an example. The inertial motion sensor may be included in the position module 200 or may be part of the device.

The spatial position module may provide a first set of data to the position module 200 for determining the "macroscopic" position and orientation of the device, and the movement module 202 may provide a second set of data to the position module 200 for determining more detailed position and orientation data. For example, if the device is a handheld printer, the spatial position module may provide a first set of data to the position module 200 for determining whether the handheld printer is in contact with the print media and/or its location and orientation. If it is determined that the handheld printer is in contact with the print media, the movement module 202 may provide a second, more detailed set of position and orientation data, as discussed above, for use to accurately print an image.

The spatial position module may also provide data for determining the location and orientation of the handheld printer on the print media in the event the handheld printer loses and regains physical contact with the print media. For example, a user may accidentally or intentionally lift the handheld printer off the print media. The position module 200, in conjunction with the spatial position module, does not depend upon contact with the print media to maintain spatial position and orientation data. If the position module 200 detects that the handheld printer has been removed from the print media, it may switch to a "spatial tracking mode". The position module 200 may determine that the handheld printer has been removed from the print media based on a signal (or lack of a signal) received from the motion sensors 204 and 206, as an example. In spatial tracking mode, the position module 200 utilizes data received from the spatial position module to determine the location and orientation of the device. Once the position module 200 determines that the handheld printer is again in contact with the print media (based on a signal or lack of signal received from the motion sensors 204 and 206), it may switch to a "detailed tracking mode" and rely on data received from the movement module 202 for determining the position and orientation of the device for printing.

All of the discussion above, regardless of the particular implementation being described, is exemplary in nature, rather than limiting. Although specific components of the position module 200 are described, methods, systems, and articles of manufacture consistent with the position module 200 may include additional or different components. For example, components of the position module 200, movement module 202, and/or processor 208 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the position module 200 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method comprising:
   determining a first movement distance and a first movement direction for a first point on a device, and a second movement distance and a second movement direction for a second point on the device; and
   determining a location and an orientation of the device based on the first movement distance and the first movement direction and the second movement distance and the second movement direction;
   identifying when the device loses physical contact with a medium; and
   selecting a spatial tracking mode when the device loses physical contact with the medium, wherein the spatial tracking mode determines three dimensional coordinates from an inertial motion sensor.

2. The method of claim 1 wherein the inertial motion sensor is an accelerometer or a gyrometer.

3. The method of claim 1, wherein the device is an image forming device for printing on the medium.

4. The method of claim 3, wherein the image forming device is handheld.

5. The method of claim 3, further comprising:
   switching the image forming device from the spatial tracking mode to an image forming mode in response to determining that the image forming device has regained physical contact with the medium.

6. The method of claim 5, wherein determining that the image forming device has regained physical contact with the medium is based on analysis of the three dimensional coordinates.

7. The method of claim 1, wherein the medium is a scanning medium and the device comprises a scanner.

8. The method of claim 1, wherein the first movement distance and the second movement distance are caused by a user operation.

9. The method of claim 1, wherein the location of the device or the orientation of the device includes three or more components.

10. The method of claim 1, wherein the location of the device includes three translational coordinates.

11. The method of claim 1, wherein the orientation of the device includes three angular parameters.

12. The method of claim 1, further comprising:
    determining print data based on image data, the location, and the orientation; and
    communicating the print data to a print mechanism configured to dispense ink.

13. The method of claim 12, further comprising:
    receiving the image data from a host device.

14. The method of claim 1, further comprising:
    receiving image signals from an imaging mechanism;
    generating image data based on the image signals, the location, and the orientation; and
    associating the location and the orientation of the device with print data or scan data.

15. The method of claim 1, wherein the device includes a printer or a scanner.

16. The method of claim 1, the first movement distance or the second movement distance is generated by at least one sensor.

17. The method of claim 16, wherein the at least one sensor includes an optical motion sensor.

18. The method of claim 17, wherein the device includes a printer or a scanner.

19. The method of claim 16, wherein the at least one sensor includes a track-ball motion sensor.

20. The method of claim 19, wherein the device includes a printer or a scanner.

21. The method of claim 16, wherein the at least one sensor includes a laser motion sensor.

22. The method of claim 21, wherein the device includes a printer or a scanner.

23. The method of claim 16, wherein the at least one sensor includes a first motion sensor and a second motion sensor, comprised of a light-emitting diode and complementary metal-oxide semiconductor pair.

24. The method of claim 23, wherein the device includes a printer or a scanner.

25. The method of claim 1, further comprising:
    zeroing an origin of the device.

26. The method of claim 25, wherein the origin is a corner of the medium.

27. The method of claim 1, wherein the device is self-propelled.

28. The method of claim 1, wherein determining the first movement distance and the first movement direction for the first point further comprises:
    detecting preprinted infrared markings from the medium; and
    correlating the preprinted infrared markings with a map.

29. The method of claim 1, further comprising:
    selecting a detailed tracking mode when the device gains physical contact with the medium.

* * * * *